(12) United States Patent
Yasuda et al.

(10) Patent No.: US 10,723,081 B2
(45) Date of Patent: Jul. 28, 2020

(54) WELDING METHOD

(71) Applicant: DENSO CORPORATION, Kariya, Aichi-pref. (JP)

(72) Inventors: Atsushi Yasuda, Kariya (JP); Yasunori Kawamoto, Kariya (JP); Naoto Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 124 days.

(21) Appl. No.: 15/571,948

(22) PCT Filed: May 18, 2016

(86) PCT No.: PCT/JP2016/002421
§ 371 (c)(1),
(2) Date: Nov. 6, 2017

(87) PCT Pub. No.: WO2016/194321
PCT Pub. Date: Dec. 8, 2016

(65) Prior Publication Data
US 2018/0126657 A1 May 10, 2018

(30) Foreign Application Priority Data

Jun. 3, 2015 (JP) .................................. 2015-113417
Mar. 31, 2016 (JP) .................................. 2016-070305

(51) Int. Cl.
*B29C 65/02* (2006.01)
*B29C 65/00* (2006.01)
(Continued)

(52) U.S. Cl.
CPC .............. *B29C 65/02* (2013.01); *B29C 65/18* (2013.01); *B29C 65/7814* (2013.01);
(Continued)

(58) Field of Classification Search
CPC ..... B29C 65/02; B29C 65/18; B29C 65/7814; B29C 65/782; B29C 65/7805;
(Continued)

(56) References Cited

U.S. PATENT DOCUMENTS 6,152,350 A * 11/2000 Hayashi ................. B23K 20/10
228/102
2010/0287930 A1* 11/2010 Lenczner ................ B29C 65/20
60/585
(Continued)

FOREIGN PATENT DOCUMENTS

JP 2005-343064 A 12/2005
JP 2008123102 A 5/2008
(Continued)

*Primary Examiner* — Michael N Orlando
*Assistant Examiner* — Abhishek A Patwardhan
(74) *Attorney, Agent, or Firm* — Harness, Dickey & Pierce, P.L.C.

(57) ABSTRACT

A welding method heats and pressurizes a contacting portion, where a first member and a second member made of resin are in contact with each other, by a pressing tool. The welding method has forming a step, forming a recessed portion, crushing a protrusion, and filling the recessed portion. The step is defined between the first member and the second member by providing the protrusion to the first member. The recessed portion is provided in a tip of the pressing tool. The protrusion of the first member is crushed in the recessed portion by being pressed toward the second member using the pressing tool. The recessed portion is filled with the molten portion of the first member and the molten portion of the second member such that a rim of an outer periphery of the recessed portion is dug into the first member and the second member.

2 Claims, 9 Drawing Sheets

(51) Int. Cl.
  *B29C 65/18* (2006.01)
  *B29C 65/78* (2006.01)
  *F01M 11/00* (2006.01)
  *F01M 11/12* (2006.01)
  *B29L 31/34* (2006.01)
  *B29L 31/00* (2006.01)
  *B29L 31/30* (2006.01)

(52) U.S. Cl.
  CPC ........ *B29C 65/7841* (2013.01); *B29C 66/112* (2013.01); *B29C 66/114* (2013.01); *B29C 66/137* (2013.01); *B29C 66/21* (2013.01); *B29C 66/53461* (2013.01); *B29C 66/542* (2013.01); *B29C 66/73921* (2013.01); *B29C 66/81431* (2013.01); *B29C 66/8322* (2013.01); *F01M 11/0004* (2013.01); *F01M 11/12* (2013.01); *B29C 66/1122* (2013.01); *B29C 66/81423* (2013.01); *B29L 2031/3055* (2013.01); *B29L 2031/3481* (2013.01); *B29L 2031/7172* (2013.01)

(58) Field of Classification Search
  CPC . B29C 65/7808; B29C 65/7802; B29C 65/78; B29C 65/7461; B29C 65/7441; B29C 65/72; B29C 65/74; B29C 65/7841; B29C 65/7844; B29C 66/73921; B29C 66/81431; B29C 66/832; B29C 66/8322; B29C 66/112; B29C 66/114; B29C 66/137; B29C 66/21; B29C 66/53461; B29C 66/542; B29C 66/1122; B29C 66/81423; B29C 66/1142; B29C 65/7451; B29L 2031/3055; B29L 2031/3481; B29L 2031/7172
  USPC ......... 156/304.1, 304.5, 304.6, 308.2, 308.4, 156/309.6
  See application file for complete search history.

(56) References Cited

U.S. PATENT DOCUMENTS

| | | | |
|---|---|---|---|
| 2013/0112336 A1* | 5/2013 | Robin | B29C 65/08 156/73.1 |
| 2016/0123791 A1 | 5/2016 | Yasuda | |

FOREIGN PATENT DOCUMENTS

| | | | |
|---|---|---|---|
| JP | 2009024510 A | 2/2009 | |
| JP | 2009041554 A | 2/2009 | |
| JP | 2014235158 A | 12/2014 | |
| WO | WO-02057066 A1 * | 7/2002 | ........... B29C 65/606 |

* cited by examiner

WIDTH DIRECTION

COMPARATIVE EXAMPLE

COMPARATIVE EXAMPLE

WELDING METHOD

CROSS REFERENCE TO RELATED APPLICATIONS

This application is a U.S. National Phase Application under 35 U.S.C. 371 of International Application No. PCT/JP2016/002421 filed on May 18, 2016 and published in Japanese as WO 2016/194321 A1 on Dec. 8, 2016. This application is based on and claims the benefit of priority from Japanese Patent Application No. 2015-113417 filed on Jun. 3, 2015 and Japanese Patent Application No. 2016-070305 filed on Mar. 31, 2016. The entire disclosures of all of the above applications are incorporated herein by reference.

TECHNICAL FIELD

The present disclosure relates to a welding method for coupling a resin body and a resin cover, which configure a fluid level detector, by welding.

BACKGROUND ART

Patent Literature 1 discloses a fluid level detector that detects a level of a fluid stored in a tank. The fluid level detector of Patent Literature 1 has a body having a flat plate shape and a cover having a bottomed tubular shape. The body and the cover define a housing chamber. The housing chamber houses a float, a magnet, and a reed switch. The float and the magnet move up and down when the fluid level changes, and the reed switch detects whether the fluid level reaches a specified level.

According to Patent Literature 1, the body has a locking hole, and the cover has a hook extending toward the locking hole. The locking hole catches the hook, whereby the cover is fixed to the body.

PRIOR ART LITERATURES

Patent Literature

Patent Literature 1: JP 2014-235158 A

SUMMARY OF INVENTION

According to studies by the inventors of the present disclosure, since the body and the cover of Patent Literature 1 are fixed to each other by the locking hole and the hook, strength becomes insufficient possibly. For example, the strength possibly becomes insufficient when an object, to which the fluid level detector is mounted, is an object, e.g., a vehicle, which is large and bumpy.

Then, it is considered to couple the body and the cover by welding such that the strength is improved. A common welding method is shown in FIG. 16A and FIG. 16B as a comparative example. According to the comparative example, a body 110 and a cover 120 are in surface contact with each other, and side surfaces of the body 110 and the cover 120 perpendicular to the contacting surface is heated and pressurized by a flat end of a pressing tool 210A as shown in FIG. 16A. According to the comparative example, a molten resin of the body 110 and a molten resin of the cover 120 are separated from each other and distanced from the contact surface as shown in FIG. 16B. As a result, a welding area becomes smaller, whereby a welding strength may be insufficient.

The present disclosure addresses the above-described issues, thus it is an objective of the present disclosure to provide a welding method that can secure a welding area to provide a certain welding strength.

A welding method welds a first member and a second member that are made of resin and in contact with each other in a contacting portion. The welding method heats and pressurizes a side portion of the contacting portion by a pressing tool.

The welding method has (i) forming a step between the first member and the second member in the side portion by providing a protrusion to the first member, (ii) forming a recessed portion in a tip of the pressing tool, the recessed portion which is to be filled with a molten portion of the first member and a molten portion of the second member, (iii) crushing the protrusion of the first member, which is located in the recessed portion, by pressing the protrusion toward the second member using the pressing tool, and (iv) filling the recessed portion with the molten portion of the first member and the molten portion of the second member such that a rim of an outer periphery of the recessed portion is dug into the first member and the second member.

According to the present disclosure, the pressing tool presses the protrusion of the first member being located in the recessed portion toward the second member and crushes the protrusion. As a result, the first member and the second member are coupled by welding in the first stage, whereby the welding area between the first member and the second member can be increased.

The protrusion is further pressurized, such that the recessed portion is filled with the molten portion of the first member and the molten portion of the second member and the rim of the outer periphery of the recessed portion is dug into the first member and the second member. Accordingly, molten resin fills the recessed portion and the first member and the second member can be coupled by welding as a whole appropriately as an injection molding. Therefore, a welding strength can be secured.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A welding method according to a first embodiment is shown in FIG. 1 to FIG. 7. A welding device 200 of the first embodiment couples a body 110 and a cover 120, which are welding objects, by welding. The body 110 and the cover 120 configure a fluid level detector 100.

Figure 1:
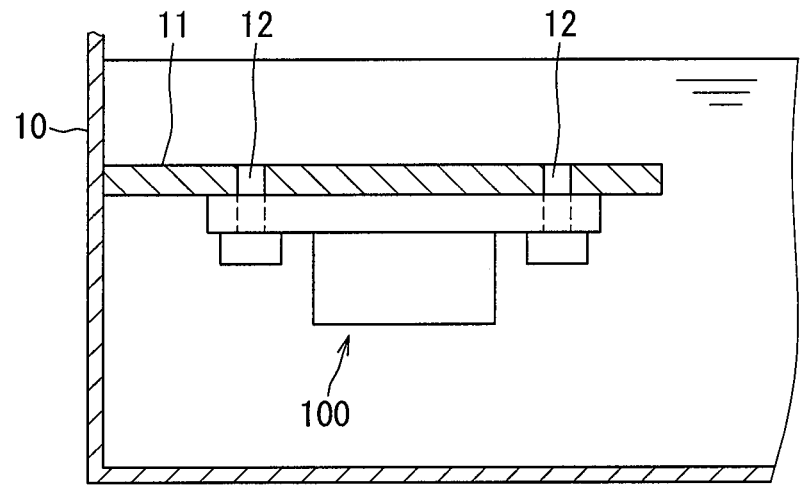
FIG. 1 is a cross-sectional view illustrating a fluid level detector mounted to an oil pan.

The fluid level detector 100 will be described briefly hereafter. The fluid level detector 100 detects a fluid level of a fluid stored in a tank. For example, the fluid level detector 100 detects a fluid level of an engine oil stored in an oil pan 10 mounted to a lower portion of an engine for a vehicle. As shown in FIG. 1, a bracket 11 is located in the oil pan 10 to extend in a horizontal direction. The fluid level detector 100 is fixed to the bracket 11 by bolts 12. The fluid level detector 100 outputs a detection signal when the fluid level of the engine oil in the oil pan 10 falls below a specified level. For example, the detection signal is input to a controller that controls an operation of a combination meter of the vehicle.

Figure 2:
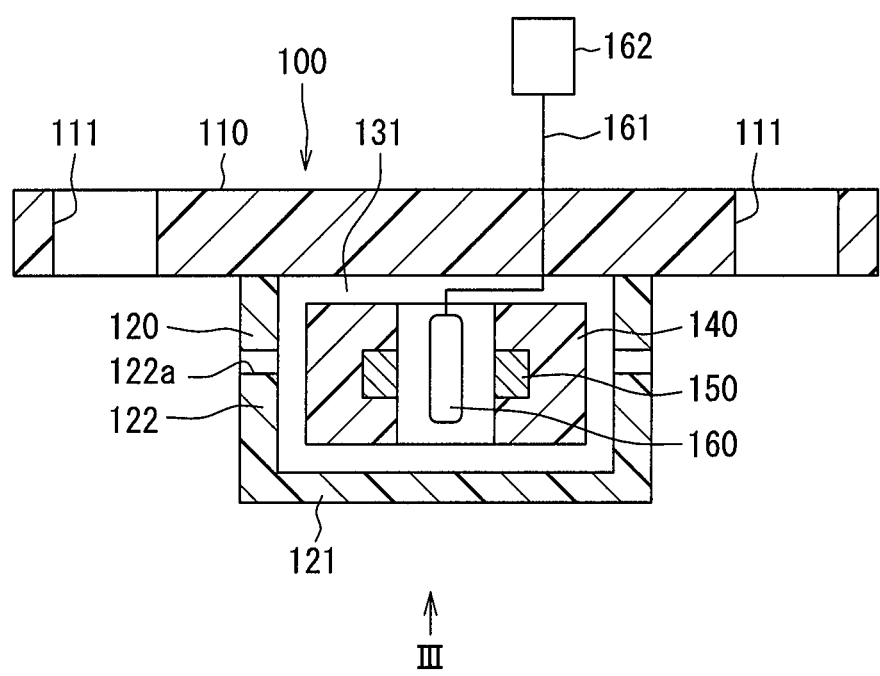
FIG. 2 is a cross-sectional view illustrating the fluid level detector.
Figure 3:
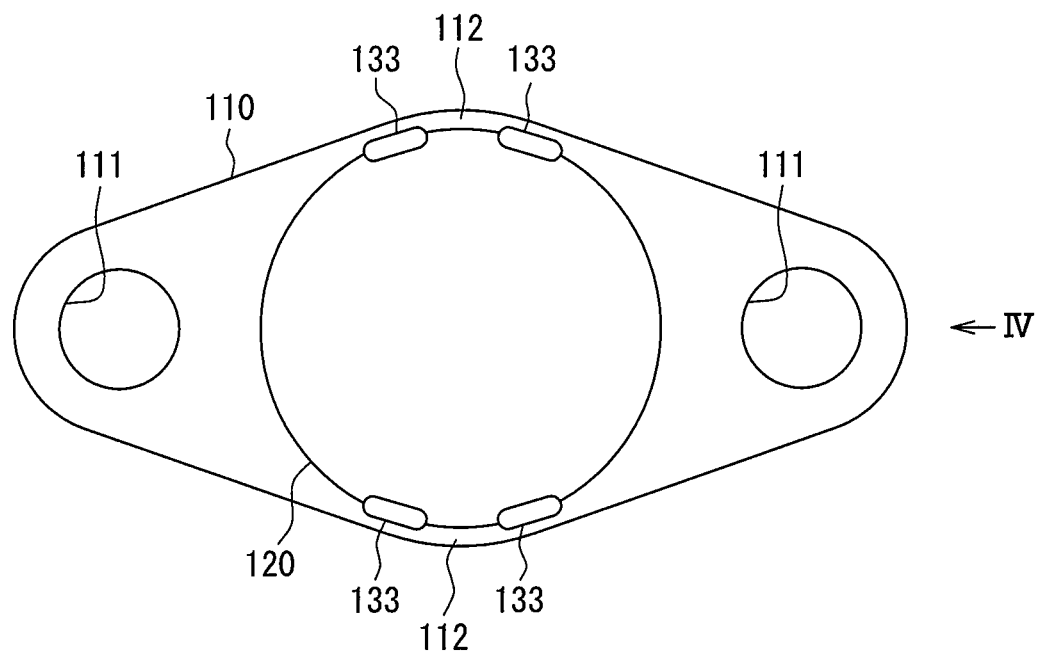
FIG. 3 is a view illustrating the fluid level detector in a direction III shown in FIG. 2.
Figure 4:
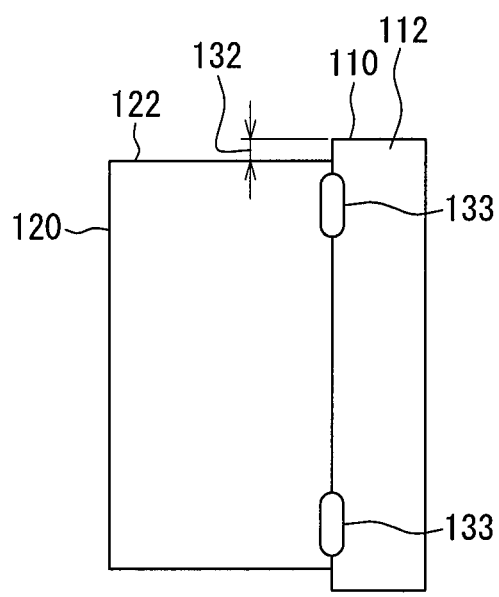
FIG. 4 is a view illustrating the fluid level detector in a direction IV shown in FIG. 3.

As shown in FIG. 2 to FIG. 4, the fluid level detector 100 has the body 110, the cover 120, a float 140, a magnet 150, and a reed switch 160. According to the fluid level detector 100 of the present embodiment, the cover 120 is located below the body 110.

For example, the body 110 is a plate member made of a resin material and has a rhomboid shape. The body 110 serves as a fixing portion that fixes a bracket 11 and seals an opening of the cover 120. The resin material contains a glass fiber to have high strength and high resistance to heat. The body 110 is located such that a plate surface of the body 110 is positioned horizontally.

The cover 120 is attached to a center portion of the body 110. The body 110 has two arm portions that extend from the center portion. The arm portions extend away from each other. Each of the two arm portions has a triangle shape, whereby the body 110 has the rhomboid shape as a whole. Each of the two arm portions has an attachment hole 111. A bolt 12 is inserted into the attachment hole 111. The body 110 serves as a first member of the present disclosure.

The cover 120 is made of a resin material and has a bottomed tubular shape. The cover 120 is located below the body 110. The body 110 and the cover 120 are coupled by welding such that a rim, which defines the opening of the cover 120, is in contact with the center portion of the body 110. The resin material contains a glass fiber to have high strength and high resistance to heat similar to the resin material forming the body 110.

The cover 120 has a bottom portion 121 serving as a bottom of the bottomed tubular shape and a sidewall 122 serving as a tube portion of the bottomed tubular shape. The cover 120 defines a housing chamber 131 therein. The housing chamber 131 houses the float 140, the magnet 150, and the reed switch 160. The sidewall 122 has a communication hole 122a through which an inside and an outside of the housing chamber 131 communicate with each other. The cover 120 serves as a second member of the present disclosure.

As shown in FIG. 3, the body 110 has two protrusions 112 protruding in a direction perpendicular to a direction in which the arm portions extend. The two protrusions 112 are, i.e., an upper portion and a lower portion of the body 110 in FIG. 3. By having the two protrusions 112, the body 110 is slightly larger than the cover 120 in the direction in which the two protrusions 112 protrude. That is, a sidewall of the body 110 is located outside the sidewall 122 of the cover 120 as shown in FIG. 4, whereby a step 132 is provided between the body 110 and the cover 120. In other words, the sidewall of the body 110 (i.e., the first member) has the protrusions 112, such that the step 132 is provided between the sidewall of the body 110 and the sidewall 122 of the cover 120 (i.e., the second member). Two or more welding portions 133 are provided in an area having the step 132. According to the present embodiment, a quantity of the welding portions 133 is four.

The float 140 is made of a resin material and has a flat cylindrical shape. A specific gravity of the resin material forming the float 140 is smaller than a specific gravity of engine oil. The float 140 is housed in the housing chamber 131 to be movable up and down as the fluid level of the engine oil flowing from the communication hole 122a into the housing chamber 131 changes.

The magnet 150 is attached to a center portion of an inner surface of the float 140 in an axial direction of the float 140. The magnet 150 moves up and down with the float 140 as the fluid level of the engine oil changes. The magnet 150 causes a magnetic field with respect to the reed switch 160.

The reed switch 160 is a switching mechanism that detects the fluid level of the engine oil. The reed switch 160 is located on a radial inner side of the float 140 and the magnet 150. The reed switch 160 is affected by the magnetic field corresponding to a position of the magnet 150 when the fluid level of the engine oil becomes a specified level or lower, and then outputs a detection signal. The detection signal is input to the controller of the combination meter through a wire 161 and a connector 162.

The welding device 200 will be described hereafter. The welding device 200 couples the body 110 and the cover 120 by welding. The welding device 200 has a pressing tool 210 (i.e., a tool for welding), a heating mechanism, and a pressurizing mechanism.

Figure 5:
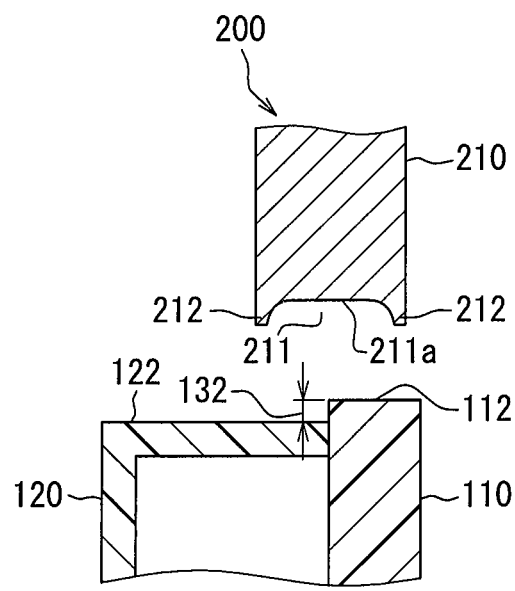
FIG. 5 is a cross-sectional view showing a stage before a welding according to a first embodiment.

The pressing tool 210 is an elongated member as shown in FIG. 5. The pressing tool 210 has an oval shape in cross section. The pressing tool 210 is heated to a specified temperature, such that the heating mechanism melts the resin material. The pressurizing mechanism moves the pressing tool 210 to press and friction the welding portion 133, whereby the pressing tool 210 pressurizes the welding portion 133. Thus, the pressing tool 210 serves as the tool for welding.

The pressing tool 210 has a tip that faces the welding portion 133. The tip is provided with a recessed portion. A depth portion of the recessed portion serves as a flat bottom 211a. The recessed portion will be hereafter referred to as a pressing recessed portion 211. An outer periphery surrounding the pressing recessed portion 211 protrudes from the bottom 211a toward the welding portion 133 and has a rim 212.

A welding method for coupling the body 110 and the cover 120 using the welding device 200 will be described hereafter.

First, the float 140, the magnet 150, and the reed switch 160 are housed in the cover 120. The body 110 and the cover 120 are fixed temporary to be an assembly configuring the fluid level detector. For example, the body 110 and the cover 120 are fixed temporary by using a positioning tool or positioning portions provided with the body 110 and the cover 120. As shown in FIG. 5, the assembly is positioned with respect to the welding device 200.

Figure 6:
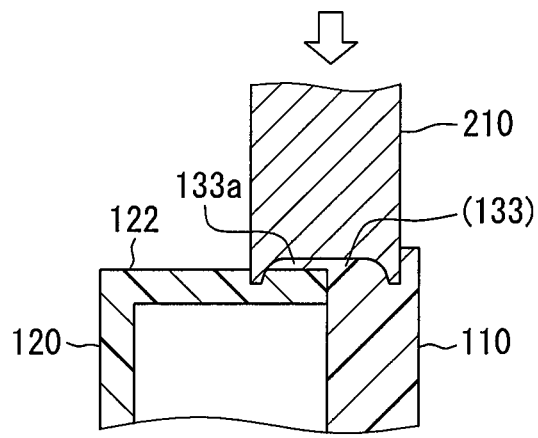
FIG. 6 is a cross-sectional view showing a stage where a protrusion of the body is crushed according to the first embodiment.

In the assembly, the body 110 and the cover 120 are in surface contact with each other in a contacting portion. The contacting portion has a side portion. The side portion is, i.e., a part of a side surface of the body 110 and a part of a side surface of the cover 120. The side surfaces of the body 110 and the cover 120 are substantially perpendicular to the contacting surface. The side portion faces the pressing tool 210. As shown in FIG. 6, the pressing tool 210 presses the and frictions the side portion. As a result, the side portion is pressurized by the pressing tool 210. The side surface of the body 110 is an outer periphery of the body 110 having the plate shape and configures a part of the protrusions 112. The side surface of the cover 120 is an outer surface of the sidewall 122. When pressurizing the side portion, the protrusions 112 of the body 110 are pressed against the sidewall 122 by the pressing tool 210 and then being crushed. A reference number 133a refers to the crushed portion in FIG. 6.

Figure 7:
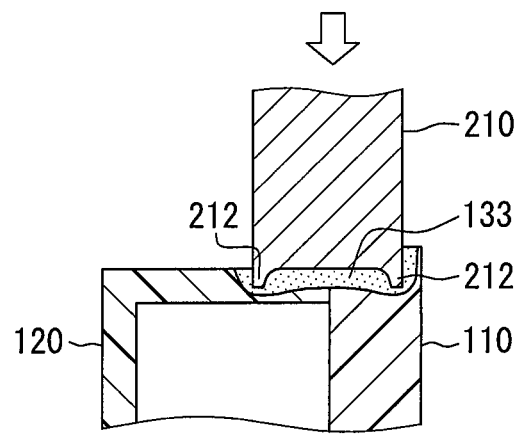
FIG. 7 is a cross-sectional view showing a stage where the welding is completed according to the first embodiment.

As shown in FIG. 7, the pressing tool 210 further presses the side surfaces of the body 110 and the cover 120 while frictioning the side portion to pressurize the side portion. Accordingly, the rim 212 of the pressing tool 210 is dug into the body 110 and the cover 120. The resin materials forming the body 110 and the cover 120 are then melted, and a molten portion of the body 110 and a molten portion of the cover 120 flow into the pressing recessed portion 211 of the pressing tool 210. The molten portions fill the pressing recessed portion 211 and serve as the welding portion 133. Finally, the pressing tool 210 is moved back away from the assembly, and the welding is completed.

According to the present embodiment, the protrusions 112 are provided in the body 110 in advance such that the step 132 is defined between the body 110 and the cover 120. In addition, the pressing recessed portion 211, which is filled with the molten portion of the body 110 and the molten portion of the cover 120, is provided in the tip in advance.

The pressing tool 210 pressurizes the protrusions 112 of the body 110, whereby the protrusions 112 of the body 110 is pressed against the cover 120 and crushed in the pressing recessed portion 211. As a result, the body 110 and the cover 120 are welded at early stage, whereby a welding area between the body 110 and the cover 120 can be increased.

When the pressing tool 210 further pressurizes the side portion, the rim 212 of the pressing recessed portion 211 is dug into the body 110 and the cover 120, whereby the pressing recessed portion 211 is filled with the molten portion of the body 110 and the molten portion of the cover 120. Therefore, the molten resin flows into the pressing recessed portion 211 similar to an injection molding, and the body 110 and the cover 120, which are objects to be welded, can be coupled by welding certainly as a whole. As a result, a welding strength can be strong enough.

According to the present embodiment, the resin materials forming the body 110 and the cover 120 contain the glass fibers. The glass fibers tangle with each other when the molten portions flow into the pressing recessed portion 211, whereby the welding strength can be improved effectively.

Second Embodiment

Figure 8:
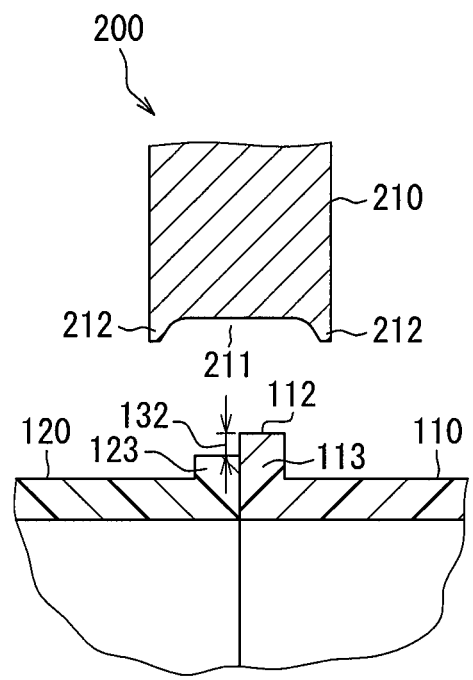
FIG. 8 is a cross-sectional view showing a stage before a welding according to a second embodiment.
Figure 9:
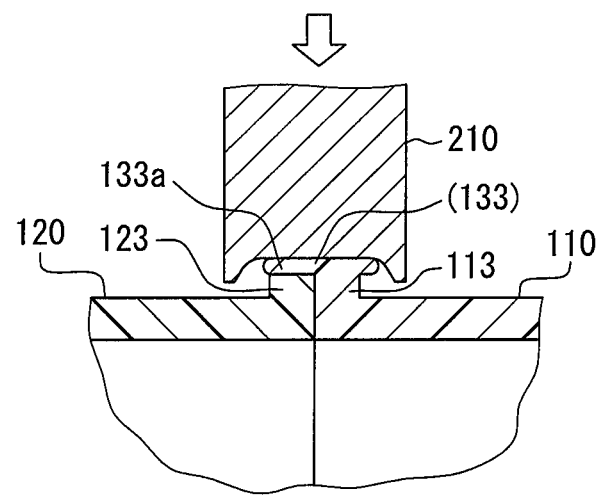
FIG. 9 is a cross-sectional view showing a stage where a protrusion of the body is crushed according to the second embodiment.
Figure 10:
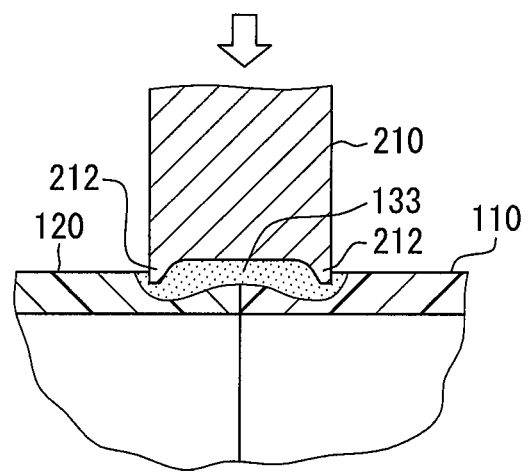
FIG. 10 is a cross-sectional view showing a stage where the welding is completed according to the second embodiment.
Figure 11:
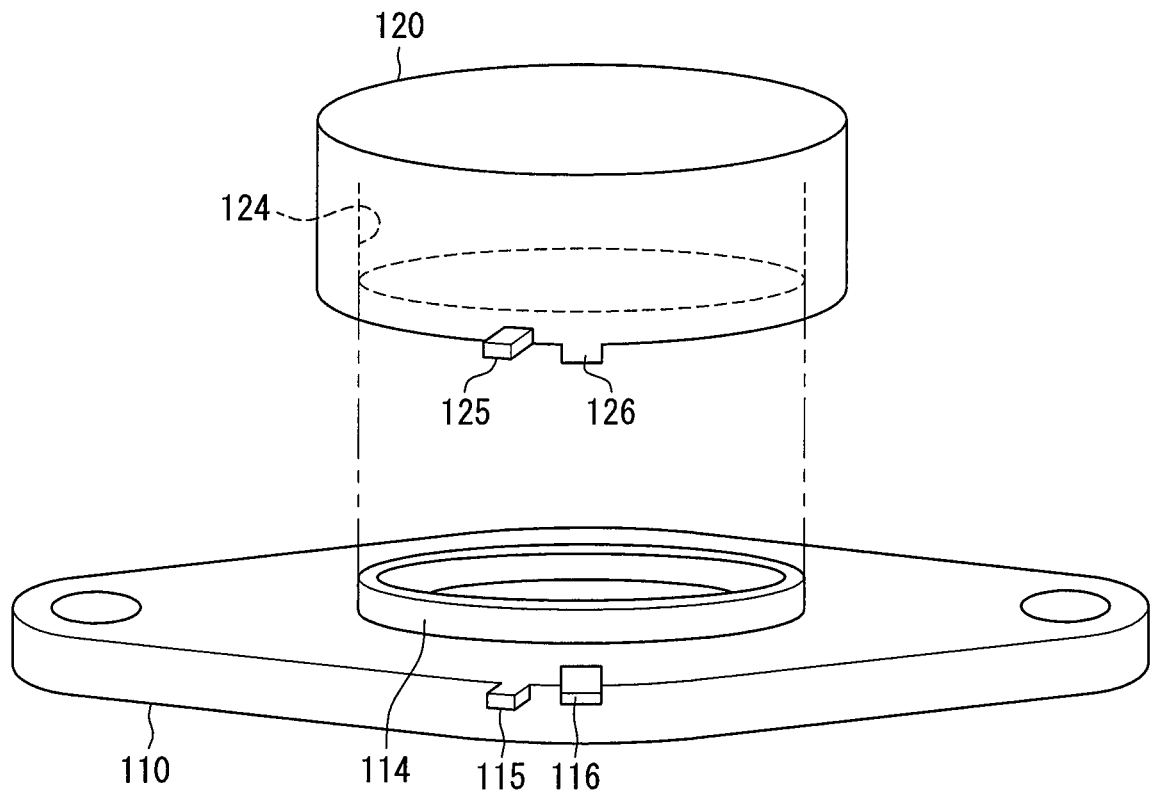
FIG. 11 is a perspective view illustrating a body and a cover according to a third embodiment.

A welding method according to a second embodiment is shown in FIG. 8 to FIG. 10. According to the second embodiment, a flange 113 is provided in the side surface of the body 110 in advance, and a flange 123 is provided in the side surface of the cover 120 in advance. That is, the flange 113 and the flange 123 are provided in the side surface of the body 110 and the side surface of the cover 120 in advance respectively. One surface of the flange 113 and one surface of the flange 123, which face each other, are in contact with each other. Therefore the fluid level detector is assembled.

As shown in FIG. 8, a protruding amount of the flange 113 from the body 110 is slightly larger than a protruding amount of the flange 123 from the cover 120. A portion of the flange 113 protruding from the flange 123 serves as the protrusion 112. That is, the flange 113 protrudes form the flange 123, whereby the step 132 is defined between the flange 113 and the flange 123. Other configurations of the welding device 200 are the same as those of the first embodiment.

A total dimension of a thickness of the flange 113 and a thickness of the flange 123 is smaller than a width dimension of the pressing recessed portion 211 of the pressing tool 210. That is, the flange 113 and the flange 123 being in contact with each other can be inserted into the pressing recessed portion 211 easily.

A contacting portion where the flange 113 and the flange 123 are in contact with each other has a side portion (i.e., a side surface). According to the present embodiment, as shown in FIG. 9, the pressing tool 210 is heated to the specified temperature and moved to friction the side portion. As a result, the side portion is pressurized by the pressing tool 210. When pressurizing the side portion, the flange 113 and the flange 123 are inserted into the pressing recessed portion 211 of the pressing tool 210. Subsequently, the protrusion 112 of the flange 113 is pressed against the flange 123 by the pressing tool 210 and thereby being crushed. A reference number 133a in FIG. 9 refers to the crushed portion.

As shown in FIG. 10, the pressing tool 210 further pressurizes the side portion of the flange 113 and the flange 123 while frictioning the side portion. The rim 212 of the pressing tool 210 is dug into the body 110 and the cover 120.

Materials forming the flange 113 and the flange 123 are melted, whereby a molten portion of the flange 113 and a molten portion of the flange 123 flow into the pressing recessed portion 211 of the pressing tool 210. The molten portions filling the pressing recessed portion 211 serve as the welding portion 133. Finally, the pressing tool 210 is moved back away from the assemble configuring the fluid level detector, and the welding is completed.

As described above, the welding can be performed similarly to the first embodiment according to the present embodiment. Therefore, the welding strength can be strong enough.

In addition, according to the present embodiment, the body 110 and the cover 120 have the flange 113 and the flange 123 serving as the side portion respectively, and the outer peripheries of the flange 113 and the flange 123 are coupled with each other by welding. Moreover, the flange 113 and the flange 123 are inserted into the pressing recessed portion 211 of the pressing tool 210, whereby the pressing tool 210 can be stably positioned in the welding. As a result, the welding can be performed easily and stably.

Third Embodiment

A welding method according to a third embodiment is shown in FIG. 11 to FIG. 14. According to the third embodiment, the side surface of the body 110 and the side surface of the cover 120 have a welding protrusion 115 and a welding protrusion 125 respectively. The welding protrusion 115 and the welding protrusion 125 are formed in advance and serve as the side portion of the contacting portion between the body 110 and the cover 120. In other words, the welding protrusion 115 (i.e., a first protrusion) is provided in the side surface of the body 110 in advance, and the welding protrusion 125 (i.e., a second protrusion) is provided in the side surface of the cover 120 in advance. According to the third embodiment, the body 110 further has a guide 114 and a recessed portion 116, and the cover 120 further has a protruding portion 126.

The welding protrusion 115 (i.e., the first protrusion) is a protrusion for welding that protrudes outward from a plate surface of the body 110 adjacent to the cover 120. The welding protrusion 115 is located, for example, at a location where the welding portion 133, which is described in the first embodiment and shown in FIG. 3, is provided. For example, four welding protrusions 115 (i.e., the welding portion) are provided.

The welding protrusion 125 (i.e., the second protrusion) is a protrusion for welding that protrudes radial outward from an end of the cover 120 adjacent to the body 110. The welding protrusion 125 is located at a location corresponding to the location of the welding protrusion 115. Accordingly, four welding protrusions 125 are provided.

Figure 13:
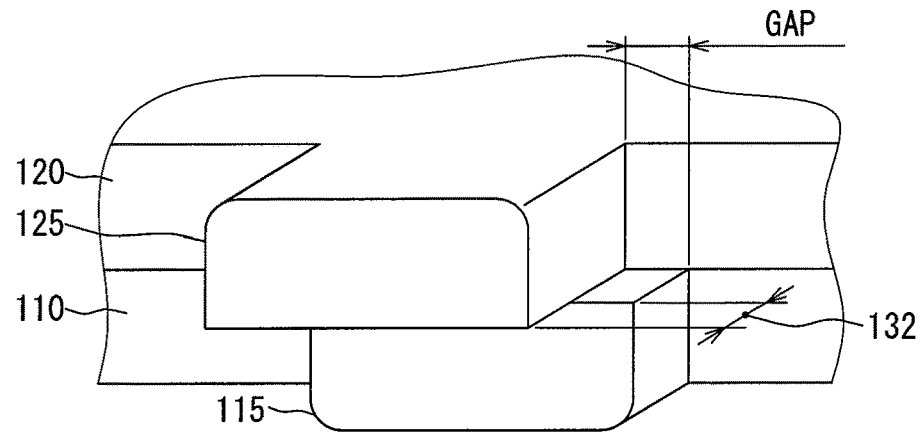
FIG. 13 is a perspective view showing that a welding protrusion shown in FIG. 11 is misaligned.

A protruding amount of the welding protrusion 125 is slightly larger than a protruding amount of the welding protrusion 115. Accordingly, when the body 110 and the cover 120 are fixed to each other temporary, a step 132 is defined between the welding protrusion 115 and the welding protrusion 125 as shown in FIG. 13. Alternatively, one protrusion of the welding protrusions 115, 125, of which protruding amount is larger than that of the other protrusion, is the welding protrusion 115. In other words, the protruding amount of the welding protrusion 115 may be larger than the protruding amount of the welding protrusion 125.

The guide 114 is a protruding portion that protrudes from the center portion of the body 110 toward the cover 120. The guide 114 has an annular shape. The cover 120 has a recessed portion. The guide 114 is inserted into the recessed portion of the cover 120 such that an outer surface of the guide 114 is in contact with an inner surface of the recessed portion of the cover 120. Alternatively, the guide 114 is inserted into the recessed portion of the cover 120 such that a micro void is defined between the outer surface of the guide 114 and the inner surface of the recessed portion.

The recessed portion 116 is provided in one of the body 110 and the cover 120. The protruding portion 126 is provided in an other one of the body 110 and the cover 120. According to the present embodiment, the recessed portion 116 is provided in the body 110 at one location of the body 110 in a circumferential direction. The one location of the body 110 in the circumferential direction is, e.g., adjacent to the welding protrusion 115. The protruding portion 126 is located at an end of the cover 120 adjacent to the body 110 such that a location of the protruding portion 126 corresponds to the location of the recessed portion 116.

Figure 12:
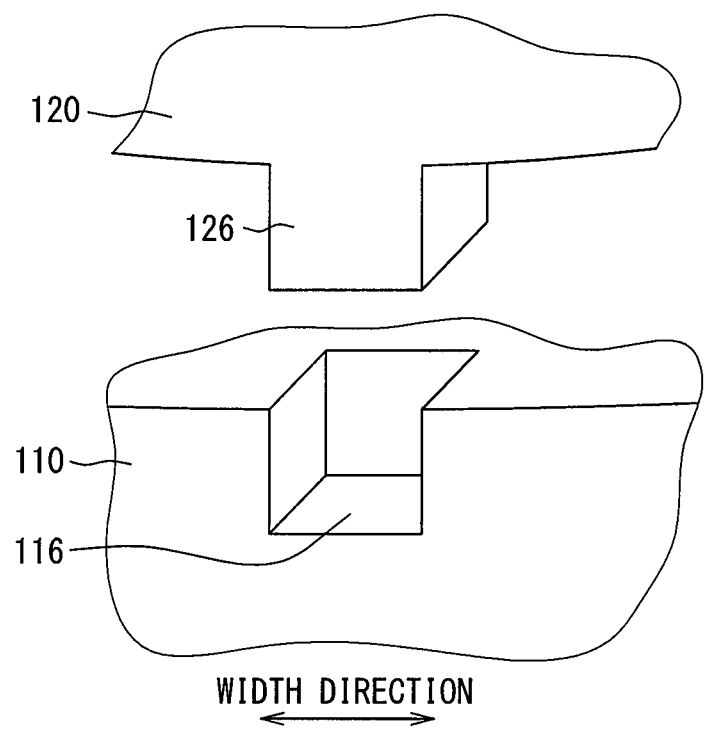
FIG. 12 is a perspective view illustrating a recessed portion and a protruding portion shown in FIG. 11.

As shown in FIG. 12, a width dimension of the recessed portion 116 is larger than a width dimension of the protruding portion 126 in a manufacture tolerance. That is, when the protruding portion 126 is inserted into the recessed portion 116, a micro void is defined between the protruding portion 126 and the recessed portion 116. In other words, the recessed portion 116 and the protruding portion 126 are fitted to each other in the fitting by a clearance fit.

According to the present embodiment, the outer surface of the guide 114 fits to an inner surface 124 of the cover 120 (i.e., of the recessed portion) when the body 110 and the cover 120 are fixed to each other temporary in assembling the fluid level detector 100. As a result, a position of the cover 120 in a plate surface direction of the body 110, i.e., a two-dimensional direction of the plate surface, is set. In addition, the protruding portion 126 is inserted into the recessed portion 116, whereby a position of the cover 120 with respect to the body 110 in the circumferential direction is set. Thus, a position of the welding protrusion 115 and a position of the welding protrusion 125 coincide with each other. As a result, it can be prevented that the welding protrusion 115 and the welding protrusion 125 are misaligned from each other.

According to the present embodiment, the welding protrusion 115 and the welding protrusion 125 are welded by the welding method using the pressing tool 210 as described in the first embodiment.

Here, there is a possibility that a gap is caused between the body 110 and the cover 120 as shown in FIG. 13 when the body 110 and the cover 120 are fixed to each other temporary in a case where the side portion to be welded is defined by the welding protrusions 115, 125 without providing the recessed portion 116 and the protruding portion 126. In this case, there is a possibility that the welding strength becomes insufficient.

Figure 14A:
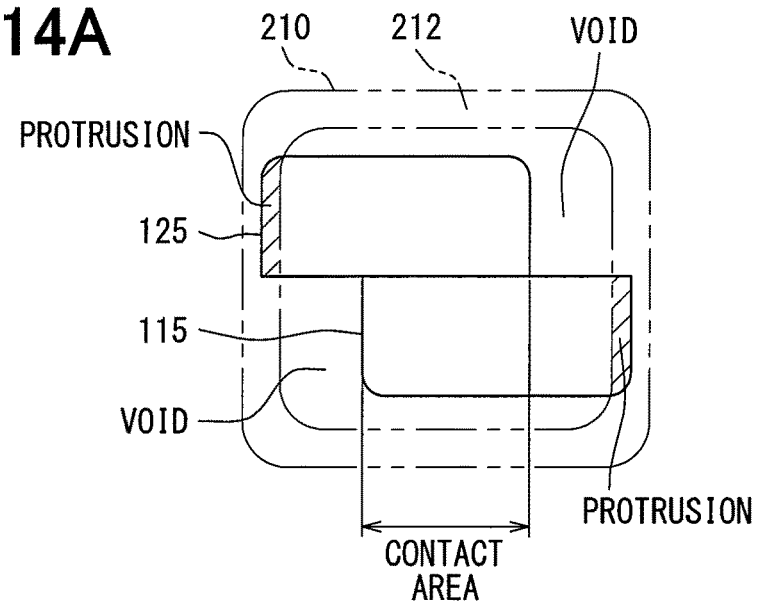
FIG. 14A is an explanatory diagram showing a locational relationship between the misaligned welding protrusion and a pressing tool.

That is, as shown in FIG. 14A, when the gap shown in FIG. 13 is large and a part of the welding protrusions 115, 125 comes out from the rim 212, a contact area where the welding protrusion 115 and the welding protrusion 125 are in contact with each other decreases, and the void defined between the rim 212 of the pressing tool 210 and the welding protrusions 115, 125 increases. As a result, the molten resin may not be able to fill an inside the rim 212, i.e., the pressing recessed portion 211, and it may not be able to pressurize the resin material sufficiently. That is, the welding strength deteriorates.

Figure 14B:
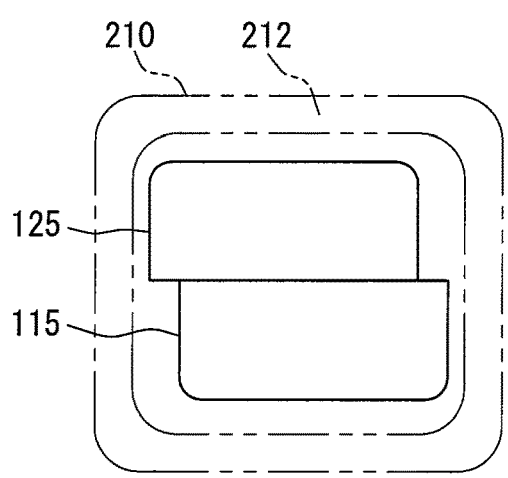
FIG. 14B is an explanatory diagram showing a locational relationship between the misaligned welding protrusion and a pressing tool.

FIG. 14B shows another example that may cause the deterioration of the welding strength. In this case, the gap is small and the welding protrusions 115, 125 are housed inside the rim 212 of the pressing tool 210. However, a flow of the molten resin may be blocked when the welding protrusion 115 and the welding protrusion 125 are misaligned, whereby the welding strength may deteriorate.

Then, according to the present embodiment, the misalignment between the welding protrusion 115 and the welding protrusion 125 is suppressed when the body 110 and the cover 120 is fixed to each other temporary by providing the recessed portion 116 and the protruding portion 126 and inserting the protruding portion 126 into the recessed portion 116. Thus, the welding strength between the welding protrusion 115 and the welding protrusion 125 can be secured.

In addition, since the recessed portion 116 and the protruding portion 126 are fitted to each other by the clearance fit, the body 110 and the cover 120 can be fixed to each other temporary without excess force.

The recessed portion 116 and the protruding portion 126 may be provided in the cover 120 and the body 110 respectively.

Modification of Third Embodiment

Figure 15:
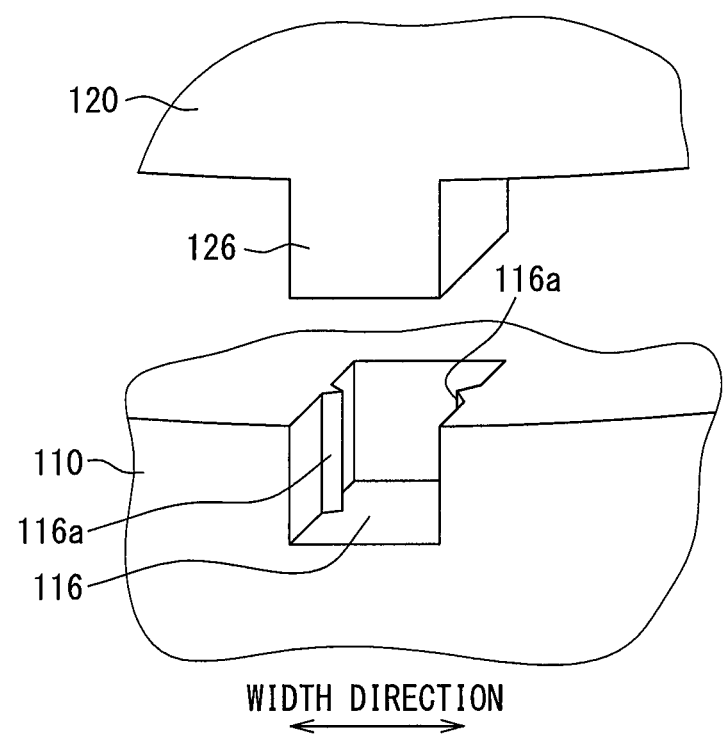
FIG. 15 is a perspective view illustrating a recessed portion and a protruding portion according to a modification example of the third embodiment.
Figure 16A:
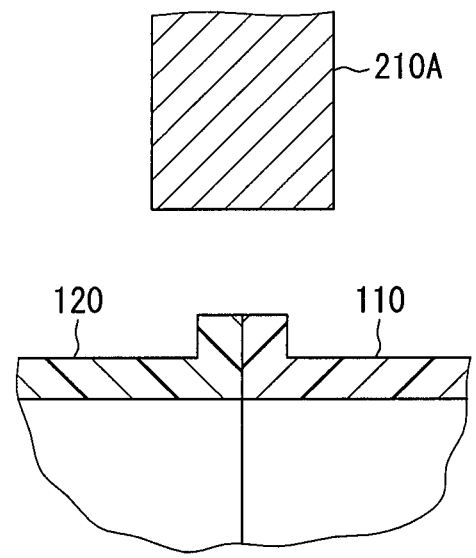
FIG. 16A is a cross-sectional view regarding a comparative example.
Figure 16B:
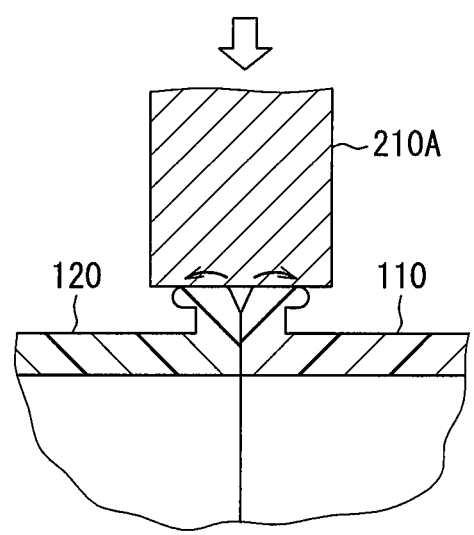
FIG. 16B is a cross-sectional view regarding a comparative example.

Regarding the third embodiment, the protruding portion 126 may be inserted into the recessed portion 116 by a loose press fitting as shown in FIG. 15. In other words, the protruding portion 126 may be inserted into the recessed portion 116 by a press fitting with an intermediate pressure.

The recessed portion 116 has two surfaces extending in a direction, which intersects with a width direction of the recessed portion, and facing each other in the direction. Each of the two surfaces has a protrusion 116a for the loose press fitting. The protrusion 116a has a triangle shape in cross section and extends in a direction in which the protruding portion 126 is inserted into the recessed portion 116.

By providing the protrusion 116a, a distance between the two protrusions 116a becomes smaller than a width dimension of the protruding portion 126 in a manufacturing tolerance. Alternatively, the distance between the two protrusions 116a becomes greater than a width dimension of the protruding portion 126 in a manufacturing tolerance. As a result, the recessed portion 116 and the protruding portion 126 are fit to each other by the loose press fitting (i.e., press fitting with an intermediate pressure). The loose press fitting includes a case where the recessed portion 116 and the protruding portion 126 are fit to each other without a void and a case where the recessed portion 116 and the protruding portion 126 are fit to each other with a micro void.

According to the present modification, accuracy in positioning the welding protrusion 115 and the welding protrusion 125 can be improved when the protruding portion 126 is inserted into the recessed portion 116, whereby the welding strength can be further improved.

Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

According to the above-described first and second embodiments, the body 110 has the protrusion 112 to define the step 132 between the cover 120. However, the protrusion 112 may be provided with the cover 120.

The welding device 200 is used to assemble the fluid level detector 100 (i.e., to weld the body 110 and the cover 120) according to the above-described embodiments. However, the use of the welding device 200 is not limited and can be used broad as long as the welding device 200 welds two resin members.

What is claimed is:

1. A welding method for welding a first member and a second member that are made of resin, the welding method heating and pressurizing the first and second members by a pressing tool, the welding method comprising:
   bringing an entire contact surface of the second member into contact with a contact surface of the first member;
   forming a first flange protruding from the first member along a direction parallel to the contact surface of the first member;
   forming a second flange protruding from the second member along a direction parallel to the contact surface of the second member, the first flange protruding beyond the second flange;
   forming a step between the first member and the second member on a side of a contacting portion of the first and second members;
   forming a recessed portion in a tip of the pressing tool, the recessed portion which is to be filled with a molten portion of the first member and a molten portion of the second member;
   crushing the protrusion of the first member, which is located in the recessed portion, by pressing the protrusion toward the second member using the pressing tool; and
   filling the recessed portion with the molten portion of the first member and the molten portion of the second member such that a rim of an outer periphery of the recessed portion is dug into the first member and the second member, wherein
   the step of forming a step between the first member and the second member is defined as a difference between the first flange and the second flange.

2. A welding method for welding a first member and a second member that are made of resin, the welding method heating and pressurizing the first and second members by a pressing tool, the welding method comprising:
   bringing an entire contact surface of the second member into contact with a contact surface of the first member to form a step between the first member and the second member on a side of a contacting portion of the first and second members;
   forming a first flange protruding from the first member along a direction parallel to the contact surface of the first member;
   forming a second flange protruding from the second member along a direction parallel to the contact surface of the second member, the first flange protruding beyond the second flange, wherein the step between the first member and the second member is defined as a difference between the first flange and the second flange;

crushing and melting the step between the first member and the second member with a tip of the pressing tool by pressing the step from the first member toward the second member; and filling a recessed portion of the tip of the pressing tool with the crushed and melted step such that a rim of an outer periphery of the recessed portion is dug into the first member and the second member.

\* \* \* \* \*